United States Patent [19]

Harth

[11] Patent Number: 5,755,466
[45] Date of Patent: May 26, 1998

[54] ANNULAR CLAMPING FLANGE

[76] Inventor: George C. Harth, 188 Water St. N. Cambridge, Ontario, Canada, N1R 3B6

[21] Appl. No.: 739,839

[22] Filed: Oct. 30, 1996

Related U.S. Application Data

[63] Continuation of Ser. No. 419,570, Apr. 10, 1995, abandoned.

[51] Int. Cl.[6] ............................................. F16L 23/12
[52] U.S. Cl. ............................ 285/412; 285/415; 24/284
[58] Field of Search .................................. 285/412, 406, 285/415, 414, 363, 373, 364, 368, 405, 334.2, 332; 24/284

[56] References Cited

U.S. PATENT DOCUMENTS

| | | | |
|---|---|---|---|
| 1,186,621 | 6/1916 | Townsend | 285/414 X |
| 2,003,488 | 4/1935 | Hook | 285/334.2 X |
| 2,507,261 | 5/1950 | Mercier | 285/368 X |
| 2,558,695 | 6/1951 | Unger | 285/363 X |
| 4,981,311 | 1/1991 | Kinney | 285/302 |

*Primary Examiner*—Heather Shackelford
*Attorney, Agent, or Firm*—Rogers & Scott

[57] ABSTRACT

An annular clamping flange for use in clamping a first pipe end portion to a second pipe end portion in an engine exhaust system includes a first arcuate flange portion and a second arcuate flange portion co-operable therewith to form a pipe receiving aperture. Each flange portion has at least one clamping bolt receiving aperture having a longitudinal axis parallel to the longitudinal axis of the pipe receiving aperture. Each flange portion also has opposite ends each having a connecting bolt receiving tubular lug on the laterally outer side thereof, the tubular lug having a longitudinal axis substantially tangential to the pipe receiving aperture. The two flange portions can be positioned around a first pipe end portion and connected together by connecting bolts passing through respective pairs of adjacent tubular lugs on the first and second flange portions, and the annular flange can then be secured to a second pipe end portion by clamping bolts passing through the clamping bolt receiving apertures.

8 Claims, 3 Drawing Sheets

ANNULAR CLAMPING FLANGE

CROSS REFERENCES TO RELATED APPLICATIONS

This is a continuation of U.S. patent application Ser. No. 08/419570 filed Apr. 10, 1995, abandoned.

BACKGROUND OF THE INVENTION

This invention relates to annular clamping flanges for use in clamping a first pipe end portion to a second pipe end portion in an engine exhaust system, for example an exhaust system for a motor vehicle.

When one or more parts of an engine exhaust system have to be replaced, problems often arise when a pipe end portion of a new part has to be clamped to the pipe end portion of an existing part, especially if the existing part has been damaged by a long time use or for other reasons.

It is therefore an object of the invention to provide an annular clamping flange which is useful in such circumstances.

SUMMARY OF THE INVENTION

According to the invention, an annular clamping flange comprises a first arcuate flange portion and a second arcuate flange portion co-operable therewith to form a pipe receiving aperture, each flange portion having at least one clamping bolt receiving aperture having a longitudinal axis parallel to the longitudinal axis of the pipe receiving aperture, each flange portion having opposite ends each having a connecting bolt receiving tubular lug on the laterally outer side thereof, said tubular lug having a longitudinal axis substantially tangentially to the pipe receiving aperture, whereby the two flange portions can be positioned around a first pipe end portion and connected together by connecting bolts passing through respective pairs of adjacent tubular lugs on the first and second flange portions, and the annular flange can then be secured to a second pipe end portion by clamping bolts passing through the clamping bolt receiving apertures.

The first flange portion may be identical to the second flange portion. One pair of adjacent tubular lugs may have a longitudinal axis parallel to the longitudinal axis of the other pair of adjacent tubular lugs, and each flange portion may have a single clamping bolt receiving aperture equi-spaced from the tubular lugs thereof.

One pair of adjacent tubular lugs may have a longitudinal axis inclined to the longitudinal axis of the other pair of adjacent tubular lugs, whereby the tubular lugs of one flange portion are closer to each other than the tubular lugs of the other flange portion. The flange portion with the closer tubular lugs may have a single clamping bolt receiving aperture equi-spaced from the lugs, and the second flange portion may have a pair of clamping bolt receiving apertures each adjacent a respective lug thereof.

Each flange portion may have a generally U-shaped cross-section, and the tubular lugs may be welded to the arcuate flange portions.

The invention also provides an engine exhaust system comprising a first pipe end portion clamped to a second pipe end portion by a clamp including an annular clamping flange as defined above.

BRIEF DESCRIPTION OF THE DRAWINGS

Embodiments of the invention will now be described, by way of example, with reference to the accompanying drawings, in which.

DESCRIPTION OF THE PREFERRED EMBODIMENT(S)

Figure 1:
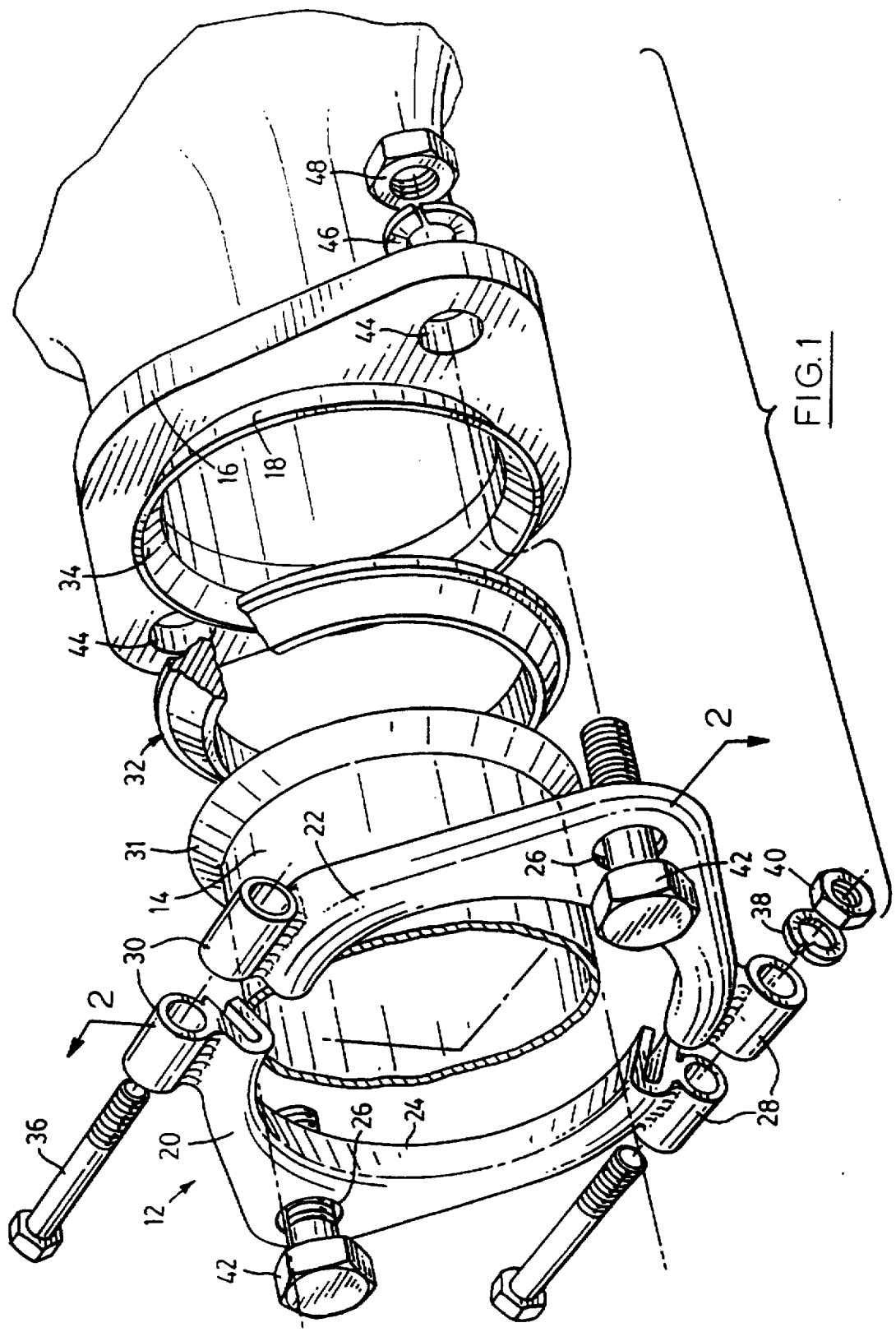
FIG. 1 is an exploded perspective view of an engine exhaust system having two pipe end portions clamped together by a clamp including an annular clamping flange in accordance with one embodiment of the invention, the front of the annular clamping flange being shown.
Figure 2:
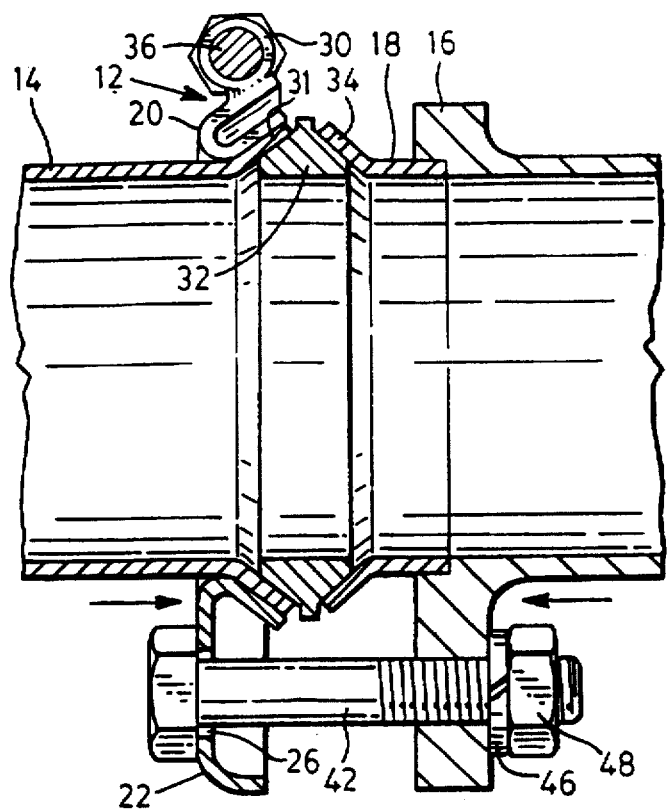
FIG. 2 is a sectional view along the line 2—2 of FIG. 1 but showing the two pipe end portions clamped together.

Referring to the drawings, FIGS. 1 and 2 show an annular clamping flange 12 in accordance with one embodiment of the invention fitted on a first pipe end portion 14 and secured to a clamping flange 16 on a second pipe end portion 18 of a motor vehicle engine exhaust system to clamp the two pipe end portions 14, 18 together. In this embodiment, the first pipe end portion 14 is an existing part extending rearwardly from an engine (not shown) and the second pipe end portion 18 extends forwardly from a new catalytic converter or muffler which is to be attached to the first pipe end portion 14.

The annular clamping flange 12 comprises identical first and second arcuate flange portions 20, 22 of generally U-shaped cross-section co-operable with one another to form a pipe receiving aperture 24 to receive the pipe end portion 14. Each flange portion 20, 22 has a single clamping bolt receiving aperture 26 and two connecting bolt receiving tubular lugs 28, 30. The tubular lugs 28, 30 are welded to opposite ends of the respective flange portions 20, 22 on the laterally outer sides thereof.

The tubular lugs 20, 30 extend substantially tangentially to the pipe receiving aperture 24, the longitudinal axis of one pair of adjacent tubular lugs 28 being parallel to the other pair of adjacent tubular lugs 30. The clamping bolt receiving aperture 26 of each flange portion 20, 22 is equi-spaced from the tubular lugs 28, 30 thereof.

The end of the pipe end portion 14 has a flange 31 formed thereon which mates with one side of an annular sealing ring 32 and a flange 34 on the end of pipe end portion 18 mates with the other side of sealing, ring 32 in known manner.

In use, the two clamping flange portions 20, 22 are positioned around the pipe end portion 14, as indicated in FIG. 1, and are connected together by connecting bolts 36 passing through respective pairs of adjacent tubular lugs 28, 30 respectively from the first and second flange portions 20, 22, the bolts 36 having washers 38 and nuts 40. The assembled clamping flange 12 is a loose fit on the pipe end portion 14.

After the sealing ring 32 has been placed in position, the annular clamping flange 12 is secured to the clamping flange 16 by clamping bolts 42 which pass through the clamping bolt receiving apertures 26 in the flange portions 20, 22 and through clamping bolt receiving apertures 44 in the clamping flange 16 to draw the flanges 31, 34 tightly into engagement with the sealing ring 32, the clamping bolts 42 having washers 46 and nuts 48.

Figure 3:
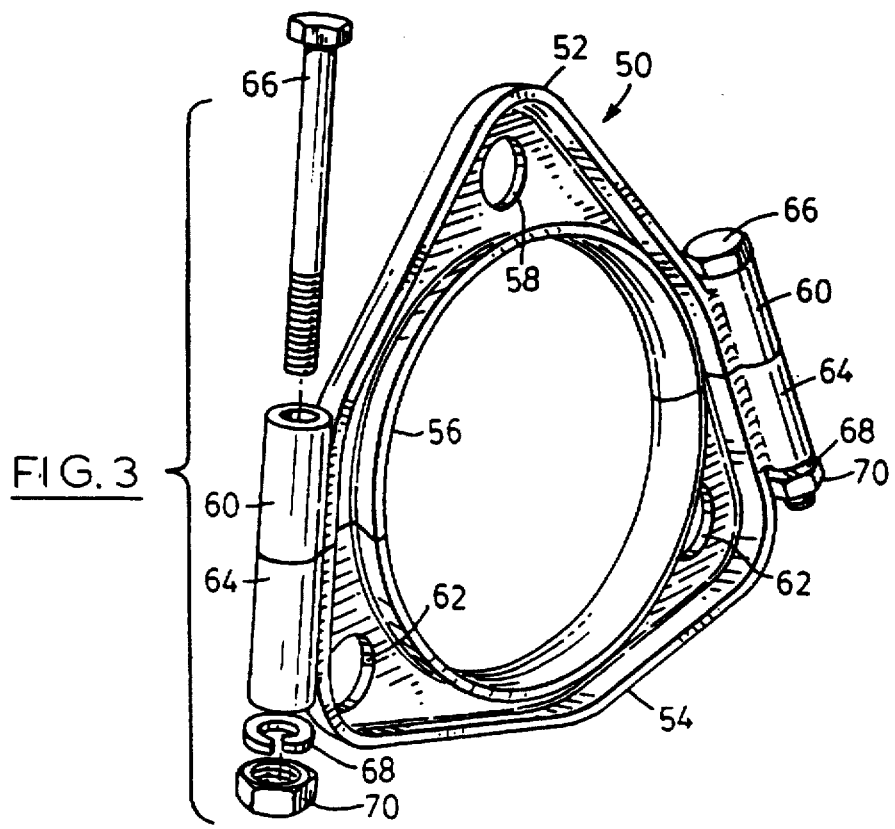
FIG. 3 is a perspective rear view of an annular clamping flange in accordance with another embodiment of the invention.
Figure 4:
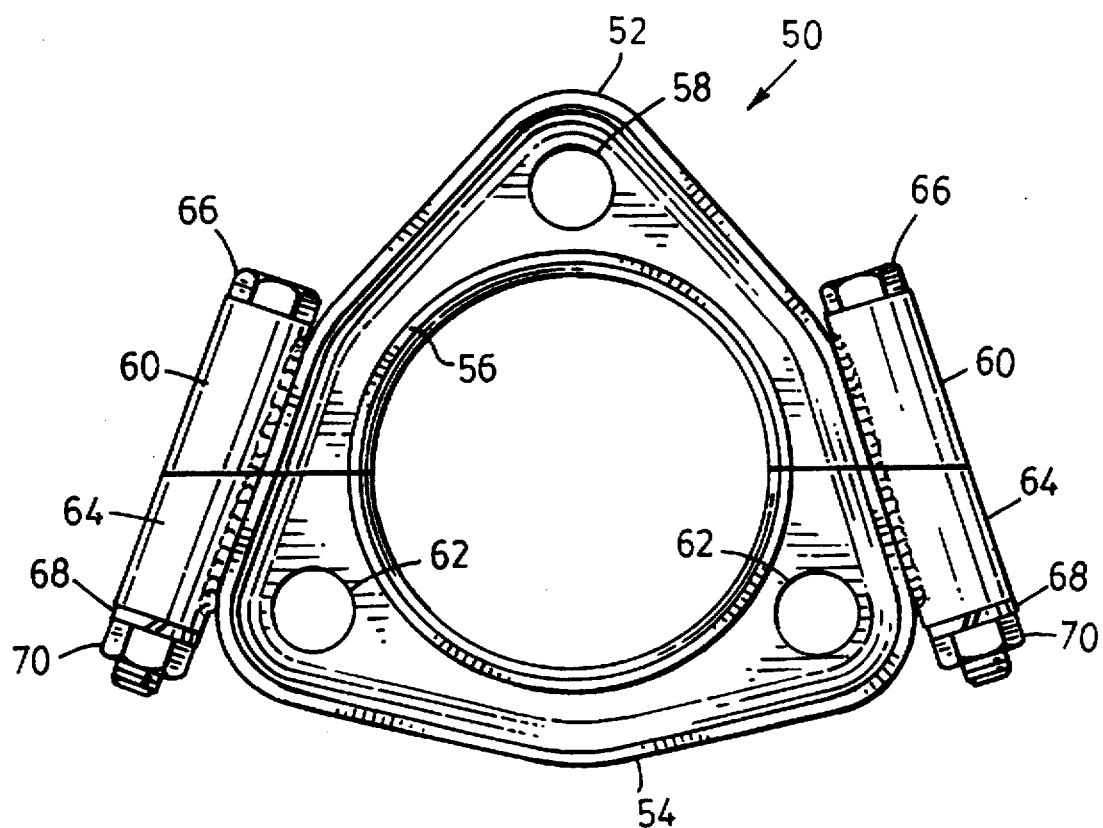
FIG. 4 is a rear view thereof.

FIGS. 3 and 4 show an annular clamping flange 50 in accordance with another embodiment of the invention comprising first and second annular flange portions 52, 54 of generally U-shaped cross-section and co-operable with one another to form a pipe receiving aperture 56. The flange portion 52 has a single clamping bolt receiving aperture 58 equi-spaced from two connecting bolt receiving tubular lugs 60 welded to opposite ends of the flange portion 52 on laterally outer sides thereof and extending tangentially to the pipe receiving aperture 56. The flange portion 54 has two clamping bolt receiving apertures 62 and two connecting bolt receiving tubular lugs 64 welded to opposite sides of the flange portion 54 on laterally outer sides thereof and extending tangentially to the pipe receiving aperture 56.

The tubular lugs 60, 64 on one side of the clamping flange 50 have a longitudinal axis inclined to the longitudinal axis of the tubular lugs 60, 64 on the other side thereof, the tubular lugs 60 on the flange portion 52 being closer to one another than the tubular lug 64 on the flange portion 54. The two clamping bolt receiving apertures 62 on the flange portion 54 are each adjacent a respective lug 64.

The clamping flange 50 is provided with two connecting bolts 66 which pass through respective pairs of tubular lugs 60, 64, the connecting bolts 66 having washers 68 and nuts 70.

It will be noted especially from FIG. 4 (although also shown in FIG. 3) that the flange portion 52 and the lugs 60 thereon on the one hand and the other flange portion 54 and the lugs 64 thereon on the other hand have mutually engaging end edges which, when the flange portions 52, 54 are forming a pipe receiving aperture, lie on a common straight line.

The manner in which annular clamping flange 50 of FIGS. 3 and 4 is used will be readily apparent to a person skilled in the art from the foregoing description of the manner of use of the embodiment shown in FIGS. 1 and 2.

The clamping flange on the other pipe end portion will of course be provided with three clamping bolt receiving apertures to receive clamping bolts passing through the three clamping bolt receiving apertures 58 and 62 of annular clamping flange 50.

Other embodiments of the invention will also be readily apparent to a person skilled in the art, the scope of the invention being defined in the appended claims.

I claim:

1. An annular clamping flange for use in clamping a first pipe end portion to a second pipe end portion in an engine exhaust system, said annular, flange comprising:

a first arcuate flange portion and a second arcuate flange portion co-operable therewith to form a pipe receiving aperture, each flange portion having at least one clamping bolt receiving aperture having a longitudinal axis parallel to the longitudinal axis of the pipe receiving aperture, each flange portion having opposite ends each having a connecting bolt receiving tubular lug on the laterally outer side thereof, said tubular lug having a longitudinal axis substantially tangential to the pipe receiving aperture, one pair of adjacent tubular lugs, one lug on each flange portion, having a longitudinal axis inclined to the longitudinal axis of the other pair of adjacent tubular lugs, whereby the tubular lugs of one flange portion are closer to each other than the tubular lugs of the other flange portion, said one flange portion and said lugs thereon on the one hand, and said other flange portion and said lugs thereon on the other hand having mutually engaging end edges which, when said flange portions are forming a pipe receiving aperture, lie on a common straight line, whereby the two flange portions can be positioned around the first pipe end portion and connected together by connecting bolts passing through respective pairs of the adjacent tubular lugs on the first and second flange portions, and the annular flange can then be secured to the second pipe end portion by clamping bolts passing through the clamping bolt receiving apertures.

2. An annular clamping flange according to claim 1 wherein the tubular lugs are welded to the arcuate flange portions.

3. An annular clamping flange according to claim 1 wherein the flange portion with the closer tubular lugs has a single clamping bolt receiving aperture equi-spaced from the lugs, and the second flange portion has a pair of clamping bolt receiving apertures each adjacent a respective lug thereof.

4. An annular clamping flange according to claim 1 wherein each flange portion has a generally U-shaped cross-section.

5. An engine exhaust system comprising a first pipe end portion clamped to a second pipe end portion by a clamp including the annular clamping flange as claimed in claim 1, the flange portions of the annular clamping flange being connected around the first pipe end portion by connecting bolts passing through the respective pairs of adjacent tubular lugs on the first and second flange portions, the second pipe end portion having a further clamping flange with clamping bolt receiving apertures, and the annular clamping flange being secured to the further clamping flange by clamping bolts passing through the clamping bolt receiving apertures of the annular clamping flange and the further clamping flange.

6. An engine exhaust system according to claim 5 wherein the tubular lugs of the annular clamping flange are welded to the arcuate flange portions.

7. An engine exhaust system according to claim 5 wherein the flange portion with the closer tubular lugs has a single clamping bolt receiving aperture equi-spaced from the lugs, and the second flange portion has a pair of clamping bolt receiving apertures each adjacent a respective lug thereof.

8. An engine exhaust system according to claim 5 wherein each flange portion of the annular clamping flange has a generally U-shaped cross-section.

\* \* \* \* \*